(12) United States Patent
Chandrasekaran et al.

(10) Patent No.: US 12,432,796 B2
(45) Date of Patent: Sep. 30, 2025

(54) SMART ENUMERATION FOR A DONGLE

(71) Applicant: Logitech Europe S.A., Lausanne (CH)

(72) Inventors: Srisenthilkumar Chandrasekaran, Chann (IN); Prajith Puthiyedath Eringathody, Kerala (IN); Jang-Fu Chiang, Hsinchu (TW)

(73) Assignee: Logitech Europe S.A., Lausanne (CH)

( * ) Notice: Subject to any disclaimer, the term of this patent is extended or adjusted under 35 U.S.C. 154(b) by 43 days.

(21) Appl. No.: 18/204,376

(22) Filed: May 31, 2023

(65) Prior Publication Data
US 2024/0407017 A1    Dec. 5, 2024

(51) Int. Cl.
  *G06F 13/42* (2006.01)
  *G06F 13/38* (2006.01)
  *H04W 76/10* (2018.01)
(52) U.S. Cl.
  CPC .......... *H04W 76/10* (2018.02); *G06F 13/382* (2013.01); *G06F 13/4282* (2013.01); *G06F 2213/0042* (2013.01)
(58) Field of Classification Search
  CPC .. H04W 76/10; G06F 13/382; G06F 13/4282; G06F 2213/0042
  See application file for complete search history.

(56) References Cited

U.S. PATENT DOCUMENTS

| | | | |
|---|---|---|---|
| 7,024,501 B1* | 4/2006 | Wright | A63F 13/843 |
| | | | 710/36 |
| 2007/0260905 A1* | 11/2007 | Marsden | G06F 1/3215 |
| | | | 713/323 |
| 2012/0300129 A1* | 11/2012 | Hetke | G06F 13/4022 |
| | | | 348/E5.057 |
| 2015/0269103 A1* | 9/2015 | Edney | G06F 13/102 |
| | | | 710/12 |
| 2016/0156376 A1* | 6/2016 | Sashittal | H04W 72/0446 |
| | | | 375/219 |
| 2020/0019517 A1* | 1/2020 | Chazot | G06F 3/167 |

\* cited by examiner

*Primary Examiner* — Henry Tsai
*Assistant Examiner* — Harry Z Wang
(74) *Attorney, Agent, or Firm* — Patterson + Sheridan, LLP

(57) ABSTRACT

Aspects of the disclosure provide an apparatus and method for smart enumeration of a dongle. An example method includes detecting a first communication interface of a dongle is in a first state. The method further includes establishing a communication link, with a host device, as a first type of device via a second communication interface of the dongle in response to detecting the first communication interface is in the first state.

23 Claims, 8 Drawing Sheets

SMART ENUMERATION FOR A DONGLE

BACKGROUND

Field

Embodiments of the present disclosure generally relate to an electronic device and, more particularly, smart enumeration for a dongle.

Description of the Related Art

A dongle may connect to a device (e.g., a computing device) to provide that device with additional functionality or facilitate communications with a peripheral device (e.g., a keyboard, mouse, audio headset, etc.) that adds functionality. The dongle may communicate with the peripheral device via wired or wireless connection. As an example, a wireless audio headset may wirelessly connect with a dongle, which is connected to a computing device, to add an audio output device and/or an audio input device to the computing device. In some cases, the dongle may enumerate as an audio device regardless of whether the audio headset is actually connected to the dongle, which limits the computing device's ability to receive or deliver an audio output without user intervention. For example, even when the audio headset is turned off or out of range of the dongle, the dongle may enumerate as the audio device, such that computing device sees the disconnected audio device as being the audio that is to be used for audio output and/or audio input, and thus not allowing other connected or integrated audio devices to be used without providing user input.

As such, a dongle that is capable of performing selective enumeration is desired. Therefore, there is need for a dongle and computer implemented method that solves the problems described above.

SUMMARY

Some aspects provide a method of operating a dongle. The method includes detecting a first communication interface of the dongle is in a first state based at least in part on a communication status between a peripheral device and the dongle. The method further includes establishing, by the dongle, a communication link with a host device in response to detecting the first communication interface is in the first state, wherein the dongle establishes the communication link as a first type of device via a second communication interface.

Some aspects provide a method of operating a host device. The method includes detecting a peripheral device, in communication with a host device via a dongle, is in a first state. The method further includes establishing a communication link, with the dongle being configured as a first type of device, via a communication interface of the host device in response to detecting the peripheral device is in the first state.

Some aspects provide a dongle. The dongle includes a first communication interface configured to communicate with a peripheral device. The dongle further includes a second communication interface configured to communicate with a host device. The dongle further includes a memory. The dongle further includes a processor coupled to the memory, the first communication interface, and the second communication interface. The processor is configured to detect the first communication interface is in a first state based at least in part on a communication status between a peripheral device and the dongle, and establish a communication link, with the host device, as a first type of device via the second communication interface in response to detecting the first communication interface is in the first state.

Some aspects provide a host device. The host device includes a communication interface, a memory, and a processor coupled to the memory. The processor is configured to detect a peripheral device, in communication with the host device via a dongle, is in a first state. The processor is further configured to establish a communication link, with the dongle being configured as a first type of device, via a communication interface of the host device in response to detecting the peripheral device is in the first state.

Some aspects provide a dongle. The dongle includes means for detecting a first communication interface of the dongle is in a first state based at least in part on a communication status between a peripheral device and the dongle; and means for establishing a communication link, with a host device, as a first type of device via a second communication interface of the dongle in response to detecting the first communication interface is in the first state.

Some aspects provide a host device. The host device includes means for detecting a peripheral device, in communication with a host device via a dongle, is in a first state; and means for establishing a communication link, with the dongle being configured as a first type of device, via a communication interface of the host device in response to detecting the peripheral device is in the first state.

Some aspects provide a non-transitory computer-readable medium. The non-transitory computer-readable medium stores code that, when executed by one or more processors of a dongle, cause the dongle to perform a method, the method comprising detecting a first communication interface of the dongle is in a first state based at least in part on a communication status between a peripheral device and the dongle; and establishing, by the dongle, a communication link with a host device in response to detecting the first communication interface is in the first state, wherein the dongle establishes the communication link as a first type of device via a second communication interface.

Some aspects provide a non-transitory computer-readable medium. The non-transitory computer-readable medium stores code that, when executed by one or more processors of a host device, cause the host device to perform a method, the method comprising detecting a peripheral device, in communication with the host device via a dongle, is in a first state; and establishing a communication link, with the dongle being configured as a first type of device, via a communication interface of the host device in response to detecting the peripheral device is in the first state.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
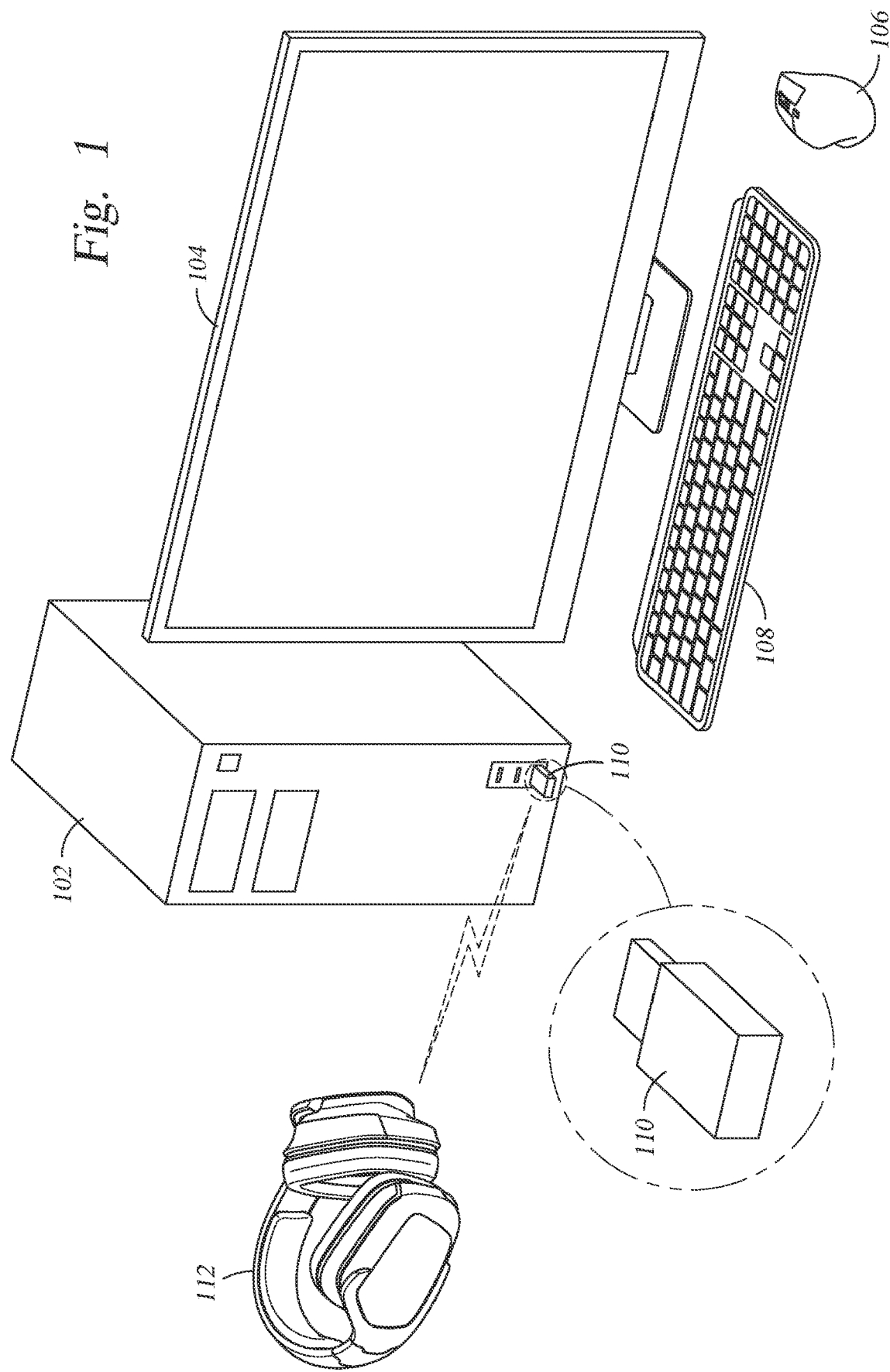
FIG. 1 illustrates a diagram of an example computer system according to embodiments described herein.

Embodiments of the present disclosure generally relate to an electronic device and, more particularly, to apparatus, methods, processing systems, and computer-readable mediums for smart enumeration of a dongle. Embodiments of the disclosure can include an improved process of transferring information between electronic devices that are configured to interact with and/or provide the transferred information to a user by use of a dongle.

In certain cases, a dongle may be used to facilitate communications between a computing device (e.g., a computer, smartphone, or tablet) and a peripheral device, such as an audio headset. For example, a dongle may connect to the computing device via a universal serial bus (USB) port, and the dongle, for example, may wirelessly connect to an audio headset to add an additional audio output device and/or audio input device at the computing device. In some cases, the dongle may enumerate as the audio output device and/or audio input device regardless of whether the wireless headset is communicatively connected to the dongle (e.g., when the headset is turned off or out of range from the dongle). In this case, at the computing device, the audio device(s) associated with the dongle would appear to be options that can be selected for operation even when the headset is actually disconnected. If the user (or computing device) selects the corresponding device when the headset is not communicatively connected to the dongle, the computing device would be unable to output sound via the headset or receive audio, resulting in a frustrating experience for the user, as the user may expect to be able to use the other options reported by the computing device and/or be unsure which audio device is in control. In some cases, the computing device may default to using the audio device(s) associated with the dongle even when the headset is not connected to the dongle, and here too, the user may encounter an unexpected experience with the audio due to the disconnected audio device being available for selection and in control of this function at the computing device.

Aspects of the present disclosure provide methods and apparatus for smart enumeration for a dongle. Smart enumeration may include, for example, a dongle enumerating as a first type of device (e.g., a peripheral device) or a virtual device (e.g., a device that is a different type than the first type of device) depending on whether the first type of device is in communication with the dongle, as further described herein. The dongle may establish a connection (e.g., via a USB enumeration operation) with a computing device based on a first configuration (e.g., a first type of device) in response to detecting that a peripheral device is in a first state, and the dongle may establish a connection with the computing device based on a second configuration (e.g., a second type of device) in response to detecting the peripheral device is in a second state. As an example, the dongle may enumerate with a host computer as an audio device in response to detecting that an audio headset is connected to the dongle, and the dongle may enumerate with the host computer as a virtual device (e.g., a human interface device (HID)) in response to detecting that the audio headset is not connected to the dongle. In this example, the ability to automatically switch the status or type of device that the host computer associates with the device(s) connected to the dongle allows the system level controlling software running on the host computer to automatically control and select the preferred audio input/output device at different times based on the status of the enumeration of the dongle, which allows for the uninterrupted or minimally interrupted delivery of audio data without user interaction and user frustration.

The methods and apparatus for smart enumeration described herein may provide various advantages. The smart enumeration described herein may facilitate a desirable user experience when a peripheral device is connected or disconnected to a host computer via a dongle. For example, the smart enumeration may allow an audio device to be effectively disabled at the host computer when such a device is not connected to (wired or wirelessly) a dongle. In response to the audio device being disabled via the dongle, the host computer may automatically select an alternatively preferred audio device versus the audio device disconnected from the dongle, thus, providing a desirable user experience, and in some cases, without any special software at the host computer to facilitate the smart enumeration.

Example Computer System

FIG. 1 is a diagram of a computer system 100. The computer system 100 may include a computer 102, a monitor 104, an input device 106, a keyboard 108, a dongle 110, and a peripheral device 112. In some embodiments, the input device 106 may be or include a computer mouse, a remote control device, a game controller (e.g., game pad, joystick, game controller, etc.), a mobile device, or any other suitable device that can be used to convert user actions into digital signals for computer processing.

The computer 102 may be any suitable computing device including, but not limited to, a desktop computer, a laptop computer, a tablet computer, a smart phone, a personal digital assistant (PDA), a wearable devices (e.g., smart watches, smart glasses), or the like.

The dongle 110 may be or include an adapter for the peripheral device 112, such as a USB adapter. The dongle 110 may be coupled to a port (e.g., a USB port) of the computer 102 and enable pass-through communications between the peripheral device 112 and the computer 102. The dongle 110 may communicate with the peripheral device 112 via wireless communications (e.g., Bluetooth or a proprietary communication protocol). In certain aspects, the dongle 110 may be coupled to the peripheral device 112 via a wired connection, such as an audio cable. The dongle 110 may be, by use of various hardware components, configured to detect whether the peripheral device 112 is connected or not connected.

In response to the connected-state or disconnected-state of the peripheral device 112, the dongle 110 may select a particular enumeration option for establishing a communication link with the computer 102 as further described herein. For example, the dongle 110 may enumerate as a virtual device different from the peripheral device 112 when the peripheral device 112 is not connected to the dongle 110. The dongle 110 may enumerate as the peripheral device (e.g., an audio output device) when the peripheral device 112 is connected to the dongle 110.

The peripheral device 112 may be or include any suitable auxiliary hardware device, for example, used to transfer information to or from the computer 102. As an example, the peripheral device 112 may be an audio output device and/or an audio input device, such as a wireless headset with speakers and/or microphone.

As further described herein, the computer 102 and/or the dongle 110 may include a computer-readable medium (not shown) that is configured to store computer code, such as instructions for performing any of the operation(s) described herein. The computer code may be executable by a processor of the computer 102 and/or the dongle 110 to control aspects of the computer 102 and/or the dongle 110 as further described herein.

Example Smart Enumeration

Figure 2:
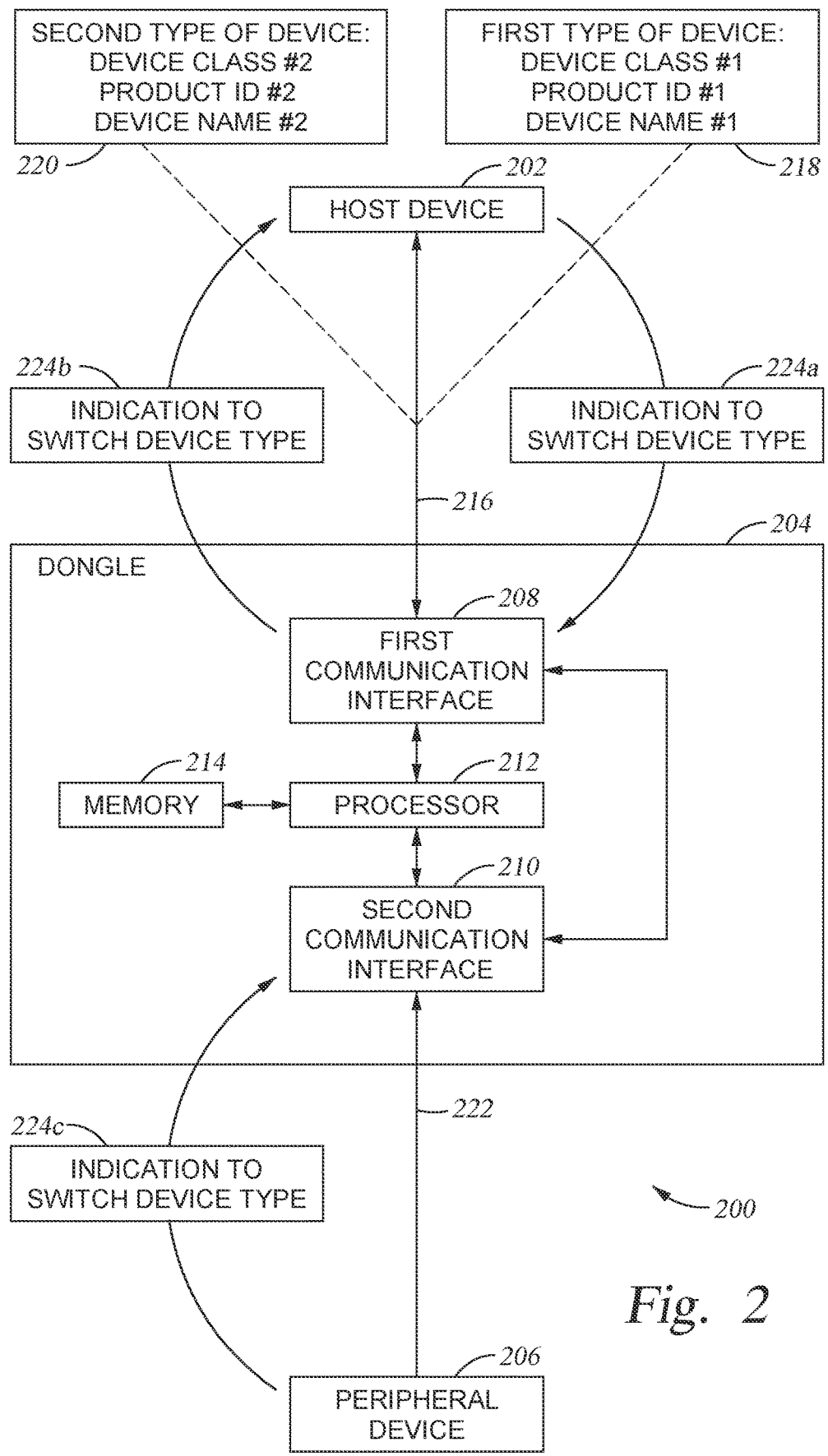
FIG. 2 illustrates a block diagram of an example computer system having a dongle capable of performing smart enumeration according to embodiments described herein.

FIG. 2 is a block diagram of an example computer system 200 having a dongle capable of performing smart enumeration. In this example, the computer system 200 may include a host device 202 (e.g., the computer 102), a dongle 204 (e.g., the dongle 110), and a peripheral device 206 (e.g., the peripheral device 112). The host device 202 may be or include a host computer, such as the computer 102, and/or any suitable computing device, such as a laptop, tablet, smart phone, etc. The peripheral device 206 may be or include any suitable auxiliary hardware device for the host device 202.

The dongle 204 may provide pass-through communications between the host device 202 and the peripheral device 206. The dongle 204 may include a first communication interface 208, a second communication interface 210, a processor 212, and a memory 214. In some cases, the dongle 204 may include a system-on-a-chip (SoC) (not shown) that includes the first communication interface 208, the second communication interface 210, the processor 212, and the memory 214.

The first communication interface 208 and/or the second communication interface 210 may be or include any suitable wireless or wired communication technology. As an example, the first communication interface 208 may include a wired communication technology (including, for example, a USB transceiver, a universal asynchronous receiver/transmitter (UART), a serial peripheral interface (SPI), inter integrated circuit (I2C), control area network (CAN), and/or an Ethernet transceiver), and the second communication interface 210 may include a wireless communication technology (such as a Bluetooth transceiver). In certain aspects, the first communication interface 208 may be in communication with the second communication interface 208 to facilitate pass-through communications between the interfaces. The dongle 204 may be in communication with the host device 202 and/or the peripheral device 206 via a wired or wireless connection. As an example, the dongle 204 may be coupled to the host device 202, for example, via a USB port (not shown). The dongle 204 may be in communication with the peripheral device 206 via a radio access technology, such as IEEE 802.11 and/or Bluetooth.

The processor 212 may be or include any suitable processing device, including, for example, a microprocessor, a microcontroller, an application processor, a neural processor, a digital signal processor (DSP), an application specific integrated circuit (ASIC), a field programmable gate array (FPGA) or other programmable logic device (PLD), discrete gate or transistor logic, discrete hardware components, a finite state machine, or any combination thereof designed to perform the operations described herein. The processor 212 may be coupled to the memory 214, the first communication interface 208, and/or the second communication interface 210. The processor 212 may monitor the connected-state and disconnected-state associated with the second communication interface 210.

As an example, in response to the second communication interface 210 being connected to the peripheral device 206 (e.g., via a communication link 222), the processor 212 may control the first communication interface 208 to establish a communication link 216 with the host device 202 as a first type of device 218. In response to the second communication interface 210 being not connected to the peripheral device 206, the processor 212 may control the first communication interface to establish the communication link 216 with the host device 202 as a second type of device 220. With respect to USB enumeration, the device type may correspond to one or more properties used to identify a particular device. For example, the first type of device 218 may include a device class, a product identifier, a vendor identifier, and/or a device name; and the second type of device 220 may include a different device class, a different product identifier, a vendor identifier, and/or a different device name.

The memory 214 may be or include any suitable electronic device configured to store information, including, for example, dynamic random-access memory (DRAM) and/or non-volatile memory. The memory 213 may store data and program codes (e.g., computer-readable instructions) for performing any of the operations as described herein, such as performing smart enumeration.

In certain aspects, the dongle 204 may obtain and/or output an indication 224a-c to switch device type and/or to use a particular device type (e.g., either the first type of device 218 and/or the second type of device 220) for the communication link 216 with the host device 202. For example, the dongle 204 may obtain the indication 224a to switch device type from the host device 202, and in response to receiving the indication 224a, the dongle 204 may switch the device type used by the first communication device 208 to communicate with the host device 202.

Figure 3:
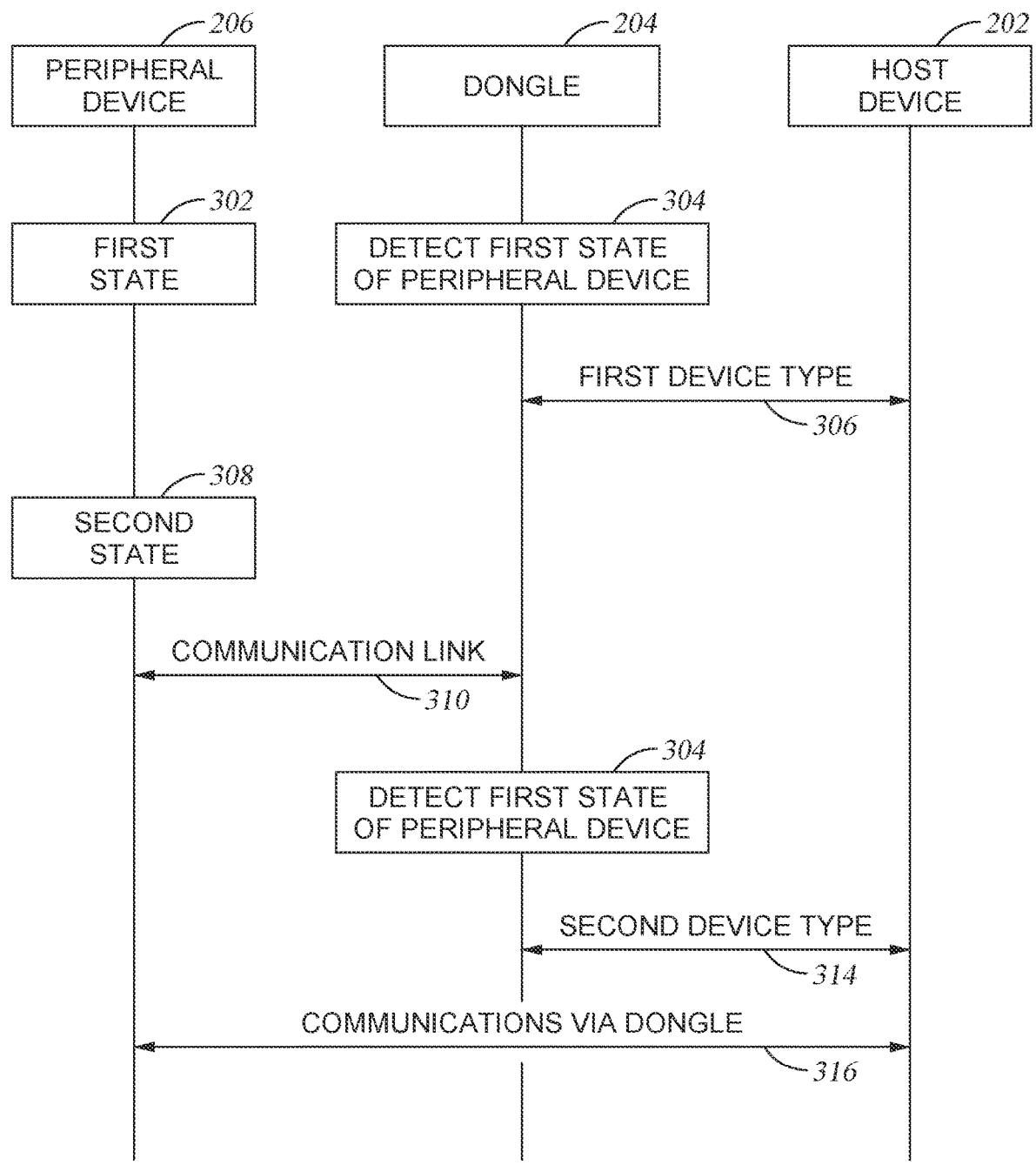
FIG. 3 illustrates a sequence diagram for smart enumeration according to embodiments described herein.

FIG. 3 illustrates an example sequence diagram for smart enumeration. In this example, the dongle 204 is transitioning among device types (e.g., the first type of device 218 and the second type of device 220) to communicate with the host device 202. The various operations described herein with respect to FIG. 3 may be implemented as software components (e.g., computer-readable instructions) that are executed on one or more processors of the respective device (e.g., the host device 202, the dongle 204, or the peripheral device 206) to cause the respective device to perform any of the operations. For example, the dongle 204 may execute computer-readable instructions via the processor 212 to cause the dongle 204 to communicate with the peripheral device 206 and/or the host device 202, to perform the state detection associated with the peripheral device, and/or select the device type for communications with the host device 202. The host device 202 may also execute computer-readable instructions, via its processor, to communicate with the dongle 204, detect the type of device the dongle 204 has enumerated itself as at different times, and make any necessary adjustments to the list of devices it communicates with to perform various activities or desired function.

At activity 302, the peripheral device 206 may be in a first state, which may not facilitate communications with the dongle 204 and/or the host device 202. For example, in the first state, the peripheral device 206 may be powered off, in a low power state, in an idle state, in an airplane mode (e.g., where the peripheral device 206 may refrain from communicating), outside of transmission range from the dongle 204, disconnected from the dongle 204, or the like.

At activity 304, the dongle 204 may detect that the peripheral device 206 is in the first state. For example, the dongle 204 may detect that there is no communication link with the peripheral device 206. The dongle 204 may detect the absence of the communication link due to the lack of a response from the peripheral device 206, for example, after the expiration of a timer. The dongle 204 may detect that the peripheral device 206 is disconnected, for example, based on a change or lack of impedance at the second communication interface 210 with respect to a wired connection. In some cases, the dongle 204 may obtain one or more indications that the peripheral device 206 is in the first state, for example, as further described herein with respect to FIG. 4.

At activity 306, the dongle 204 may establish a communication link with the host device 202 as the first type of device (e.g., a virtual device) in response to detecting the peripheral device is in the first state. In certain aspects, the dongle 204 may establish the communication link with the host device 202 via a USB enumeration operation. For example, the dongle 204 may provide, to the host device 202, a device descriptor indicating the first type of device, which may be a virtual device different from the actual device type associated with the peripheral device 206. The device descriptor may provide basic device information associated with a peripheral device, and the host device may use the device information to determine which device driver to load for the peripheral device. For example, the device descriptor may include a device class, a device subclass, a vendor identifier, a product identifier (e.g., an identifier assigned by the manufacturer), and/or an indication of a device name (e.g., a string descriptor describing the product). Suppose, for example, the peripheral device is an audio device, and the first type of device is an HID. Establishing the communication link between the dongle 204 and the host device 202 as an HID may prevent the host device 202 from considering the peripheral device 206 to be an audio device. Establishing the communication link as an HID device may further prevent the host device from providing an audio device associated with the peripheral device 206 as an option for audio output and/or audio input. Such operations at the dongle 204 may enhance the user experience at the host device 202, in some cases, without any special software at the host device 202, for example, due to the host device 202 loading the drivers associated with the first type of device, which may be virtual and different from the peripheral device 206.

At activity 308, the peripheral device 206 may be in a second state different from the first state. The second state associated with the peripheral device 206 may facilitate communications with the dongle 204 and/or the host device 202. For example, in the second state, the peripheral device 206 may be powered on, within transmission range of the dongle 204, connected to the dongle 204, or the like.

At activity 310, the dongle 204 may be in communication with the peripheral device 206 via a communication link. For example, the dongle 204 may be in communication with the peripheral device 206 via a wireless communication link, such as Bluetooth and/or wireless local area network (WLAN) communications. In some cases, the dongle 204 may be in communication with the peripheral device 206 via a wired communication link, such as an audio cable, Ethernet cable, optical cable, etc.

At activity 312, the dongle 204 may detect that the peripheral device 206 is in the second state. For example, the dongle 204 may detect that there is a communication link between the dongle 204 and the peripheral device 206. The dongle 204 may detect the communication link between the dongle 204 and the peripheral device 206 based at least in part on signal(s) being received from the peripheral device 206. The dongle 204 may detect that the peripheral device 206 is connected, for example, based on a change in impedance at the second communication interface 210 with respect to a wired connection. In some cases, the dongle 204 may obtain one or more indications that the peripheral device 206 is in the second state, for example, as further described herein with respect to FIG. 4.

At activity 314, the dongle 204 may establish a communication link with the host device 202 as the second type of device (e.g., an audio device) in response to detecting the peripheral device is in the second state. In certain aspects, the dongle 204 may establish the communication link with the host device 202 via a USB enumeration operation. For example, the dongle 204 may provide, to the host device 202, a device descriptor indicating the second type of device, which may be the actual device type associated with the peripheral device 206. In some aspects, the dongle 204 may perform a virtual or actual firmware upgrade in order to switch from the first type of device to the second type of device, or vice versa. For example, the dongle 204 may send a request to perform a firmware upgrade to the host device 202, send an indication to the host device 202 that the dongle 204 will be performing a firmware upgrade (which may actually be a virtual firmware upgrade), or initiate a virtual firmware upgrade to switch from the first type of device to the second type of device, or vice versa. Establishing the communication link between the dongle 204 and the host device 202 as the second type of device may allow the host device 202 to communicate with the peripheral device 206 and treat the peripheral device 206 as being the actual device type associated with the peripheral device 206 instead of the virtual device type (e.g., the first type of device). Here too, such operations at the dongle 204 may enhance the user experience at the host device 202, in some cases, without any special software at the host device 202, for example, due to the host device 202 loading the actual drivers associated with the peripheral device 206.

At activity 316, the dongle 204 may facilitate pass-through communications between the peripheral device 206 and the host device 202 using the second type of device. For example, the host device 202 may provide audio information to the peripheral device 206 via the dongle 204 for the peripheral device 206 to output through one or more speakers (not shown).

Figure 4:
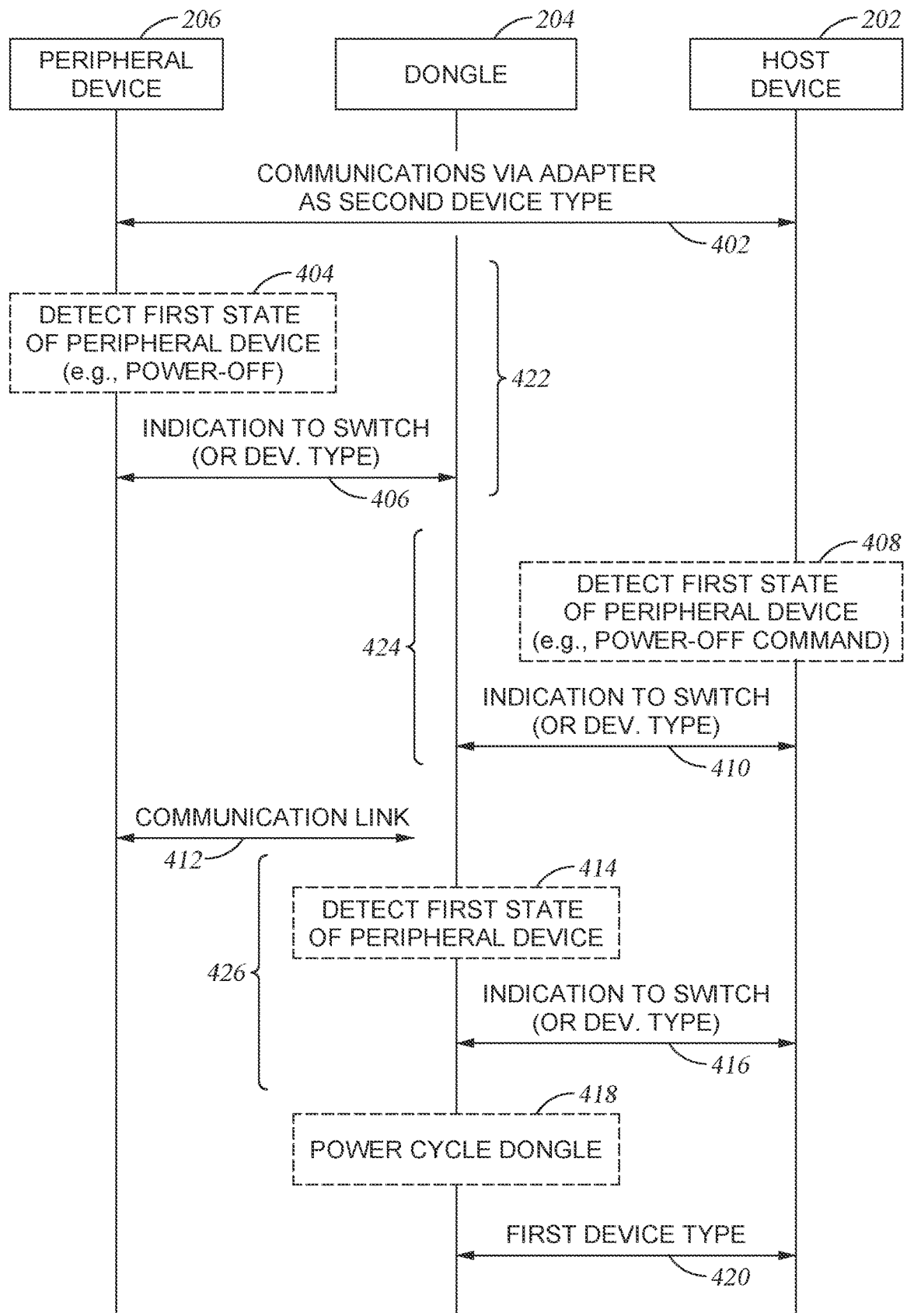
FIG. 4 illustrates a sequence diagram for smart enumeration using various switching indications, according to embodiments described herein.

FIG. 4 illustrates a sequence diagram for smart enumeration using various switching indications amongst the example devices. In this example, one of the devices may notify another one of the devices to switch device types or to use a particular device type for the communication link between the dongle and the host device. As examples, a first sequence 422 corresponds to a notification from the peripheral device 206 to the dongle 204, a second sequence 424 corresponds to a notification from the host device 204 to the dongle 204, and a third sequence 426 corresponds to a notification from the dongle 204 to the host device 202. It will be appreciated that the smart enumeration described herein may be performed using the first sequence 422, the second sequence 424, the third sequence 426, or any combinations thereof. The various operations described herein with respect to FIG. 4 may be implemented as software components (e.g., computer-readable instructions) that are executed on one or more processors of the respective device (e.g., the host device 202, the dongle 204, or the peripheral device 206) to cause the respective device to perform any of the operations, for example, as described herein with respect to FIG. 4.

At activity 402, the dongle 204 may facilitate pass-through communications between the peripheral device 206 and the host device 202. The dongle 204 may communicate with the host device 202 as the second type of device (e.g., an audio device).

In certain aspects, the peripheral device 206 may notify the dongle 204 to switch to (or use) the first type of device for the communication link between the dongle 204 and the host device 202 in the first sequence 422. At activity 404, the peripheral device 206 may detect that the peripheral device 206 is in or will be in the first state. For example, the peripheral device 206 may detect a command to power off or to connect with a different dongle and/or a different host device. The peripheral device 206 may detect a low battery level that cannot facilitate communications with the dongle 204. The peripheral device 206 may detect channel conditions that do not facilitate communications with the dongle 204, for example, being on the edge of the transmission range for a communication link between the peripheral device 206 and the dongle 204. At activity 406, the peripheral device 206 may send, to the dongle 204, an indication to switch to the first type of device and/or an indication to use the first type of device for the communication link.

For certain aspects, the host device 202 may notify the dongle 204 to switch to (or use) the first type of device for the communication link between the dongle 204 and the host device 202 in the second sequence 422. At activity 408, the host device 202 may detect that the peripheral device 206 is in or will be in the first state. As an example, the host device 202 may obtain an indication to power off the peripheral device 206, for example, via a user-space command. At activity 410, the host device 202 may send, to the dongle 204, an indication to switch to the first type of device and/or an indication to use the first type of device for the communication link. In certain aspects, the host device 202 may send the indication as an indication to perform a device firmware upgrade.

At activity 412, the communication link between the peripheral device 206 and the dongle 204 may be disconnected. For example, the peripheral device 206 may power off, enter a low power mode, move out of transmission range from the dongle 204, and/or be disconnected from a cable that facilitates communications between the peripheral device 206 and the dongle 204.

In certain aspects, the dongle 204 may notify the host device 202 to switch to (or use) the first type of device for the communication link between the dongle 204 and the host device 202 in the third sequence 426. At activity 414, the dongle 204 may detect that the peripheral device 206 is in the first state. For example, in response to obtaining any of the indications from the peripheral device and/or the host device 202 as occurred at activity 406 and activity 410, the dongle 204 may identify that the peripheral device 206 is in the first state. In some cases, the dongle 204 may detect that the communication link is disconnected as occurred at activity 412. At activity 416, the dongle 204 may send, to the host device 202, an indication to switch to the first type of device and/or an indication to use the first type of device for the communication link.

In some cases, at activity 418, the dongle 204 may perform a power cycle in response to detecting the peripheral device 206 being in the first state. The power cycle may allow the dongle 204 to switch to the second type of device for communications between the host device 202 and the dongle 204.

At activity 420, the dongle 204 may establish a communication link between the host device 202 and the dongle 204 as the first type of device, for example, as described herein with respect to FIG. 3. For example, the dongle 204 may perform a USB enumeration process to establish the communication link.

While the examples depicted in FIG. 4 are described herein with respect to various indications for switching from the second device type to the first device type and/or providing a particular device type to use for communications between the dongle and the host device, aspects of the present disclosure may also be applied to various indications to switch to any device type or to use any particular device. For example, the dongle 204 may be capable of establishing the communication link between the host device 202 and the dongle 204 using any number of device types.

It will be appreciated that the first state and second state and the detection of such states described herein may correspond to counterpart states associated with a communication interface of the dongle, such as the second communication interface 210. The dongle may detect the state of the peripheral device via the second communication interface and a counterpart state corresponding to the second communication interface. As an example, when the peripheral device is not in communication with the dongle, the second communication interface of the dongle may be in a disconnected state, for example, without a communication link to the peripheral device.

Figure 5:
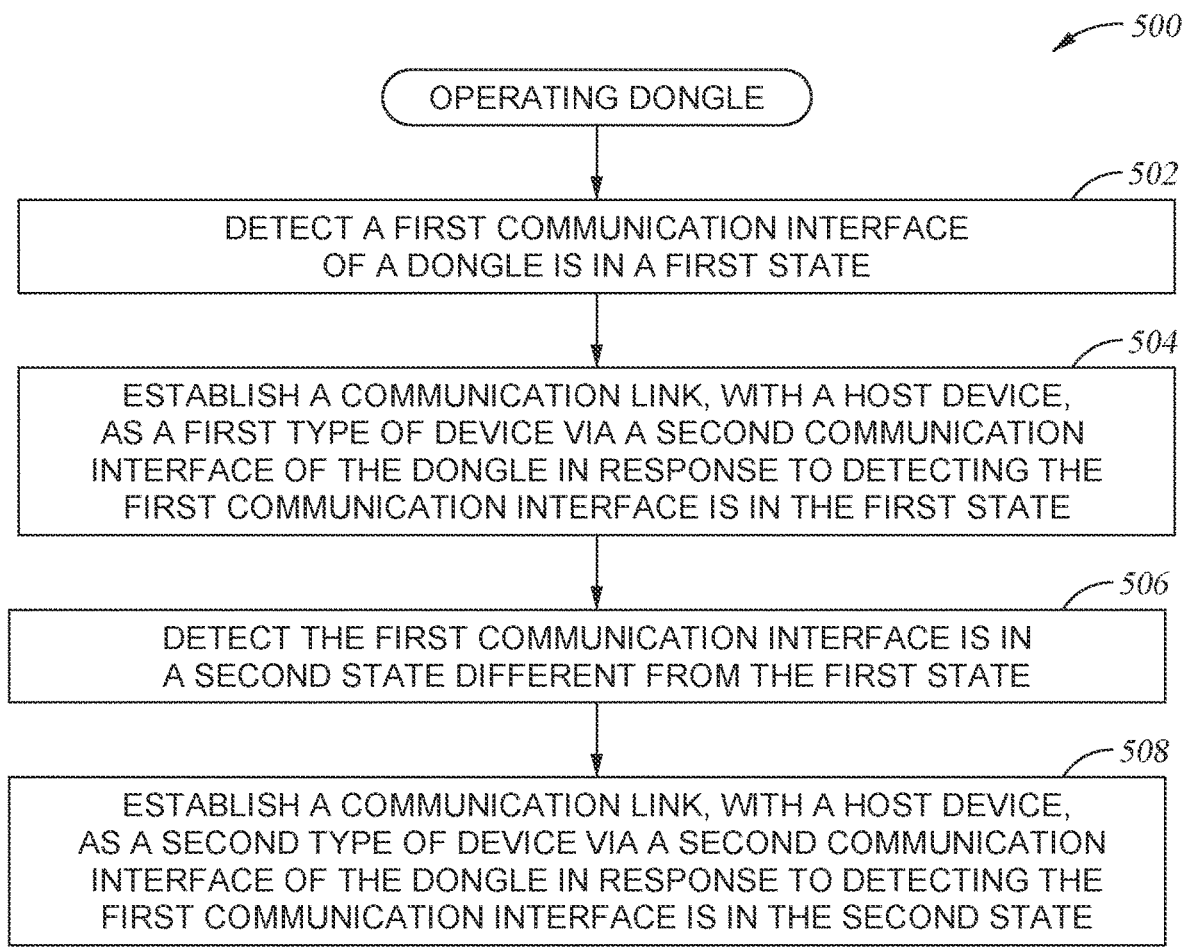
FIG. 5 illustrates an example of a method flow for operating an adapter, according to embodiments described herein.

FIG. 5 is a flow diagram illustrating example operations 500 for operating a dongle. The operations may be performed by a dongle, such as the dongle 204 as described herein with respect to FIGS. 1-4.

The operations 500 may optionally begin, at activity 502, where the dongle may detect a first communication interface (e.g., the second communication interface 210) of the dongle is in a first state. The dongle may detect the first state of the first communication interface based at least in part on a communication status (e.g., the peripheral device being in communication with the dongle) between a peripheral device and the dongle. The first state may be or include when the dongle is in communication with a peripheral device (e.g., the peripheral device 206) via the first communication interface. In some cases, the dongle may be in communication with the peripheral device via a wired communication interface (e.g., an audio port or Ethernet port). In certain cases, the dongle may be in communication with the peripheral device via a wireless communication interface (e.g., WLAN transceiver or Bluetooth transceiver).

At activity 504, the dongle may establish a communication link, with a host device (e.g., the host device 202), as a first type of device (e.g., the second type of device 220) via a second communication interface (e.g., the first communication interface 208) of the dongle in response to detecting the first communication interface is in the first state. The dongle may establish the communication link as the first type of device via the second communication interface. For example, to establish the communication link, the dongle may perform a USB enumeration operation, which includes communicating with the host device to allow the host device to detect the presence of the dongle, to determine what type of device is connected (e.g., the first type of device or the second type of device), and select a configuration for communicating with the dongle (e.g., device drivers, a transfer rate for communications, etc.). In certain aspects, the dongle may perform the USB enumeration operation as the first type of device.

At activity 506, the dongle may detect the first communication interface is in a second state different from the first state. The second state may be or include when the dongle is not in communication with the peripheral device via the first communication interface. For example, the peripheral device may power off or move out of transmission range to the dongle, and the dongle may detect that the dongle is not in communication with the peripheral device.

At activity 508, the dongle may establish the communication link, with the host device, as a second type of device (e.g., the first type of device 218) via the second communication interface in response to detecting the first communication interface is in the second state. The dongle may establish the communication link as the second type of device via the second communication interface. For example, the second type of device may be or include a virtual device type different from the actual type of device associated with the peripheral device. Establishing the communication link as the second type of device may prevent the host device 202 from considering the peripheral device as being an option for use, for example, as being on option available for audio output and/or audio input. In certain aspects, the dongle may perform the USB enumeration operation as the second type of device.

In certain aspects, the communication link between the dongle and the host device may be a USB communication link. For example, during a USB enumeration operation, the dongle may provide, to the host device, a device descriptor including or indicating the first type of device or the second type of device depending on the state of the first communication interface of the dongle. As an example, to establish the communication link as the first type of device, the dongle may provide a first product identifier (e.g., a serial number associated with the product) and a first device class (e.g., an audio class) associated with the first type of device. To establish the communication link as the second type of device, the dongle may provide a second product identifier and a second device class associated with the second type of device, where the first product identifier is different from the second product identifier, and the first device class is different from the second device class.

For certain aspects, the dongle may be capable of establishing a communication link with the host device as any of various device types (e.g., audio, video, HID, etc.). For example, the first type of device may include an audio device, and the second type of device may include a non-audio device. In some cases, the first type of device may include an audio device, and the second type of device may include a human interface device (HID).

In certain aspects, the dongle may have a wired communication interface and/or a wireless communication interface to facilitate pass-through communications between the peripheral device and the host device. For example, the first communication interface may include a wireless transceiver (e.g., a WLAN transceiver or a Bluetooth transceiver), the second communication interface may include a universal serial bus (USB) transceiver.

For certain aspects, the dongle may obtain or output an indication to switch to (or use) a particular device type for the communication link with the host device. Such an indication may trigger the dongle and/or the host device to re-establish the communication link using the indicated device type. As an example, the host device may detect the first communication interface is in the first state, for example, via a command to enable, disable, power on, or power off the peripheral device. The dongle may obtain, from the host device, an indication to establish the communication link as the first type of device. To detect the first communication interface is in the first state, the dongle may detect the first communication interface is in the first state based on the indication. In some cases, the dongle may send, to the host device, an indication to establish the communication link as the first type of device in response to detecting the first communication interface is in the first state. In certain cases, the peripheral device may detect the first communication interface is in the first state, and the peripheral device may send, to the dongle, an indication to establish the communication link as the first type of device in response to detecting the first communication interface is in the first state. In some cases, to establish the communication link, the dongle may initiate or perform a power cycle in response to detecting the first communication interface is in the first state or the second state.

Figure 6:
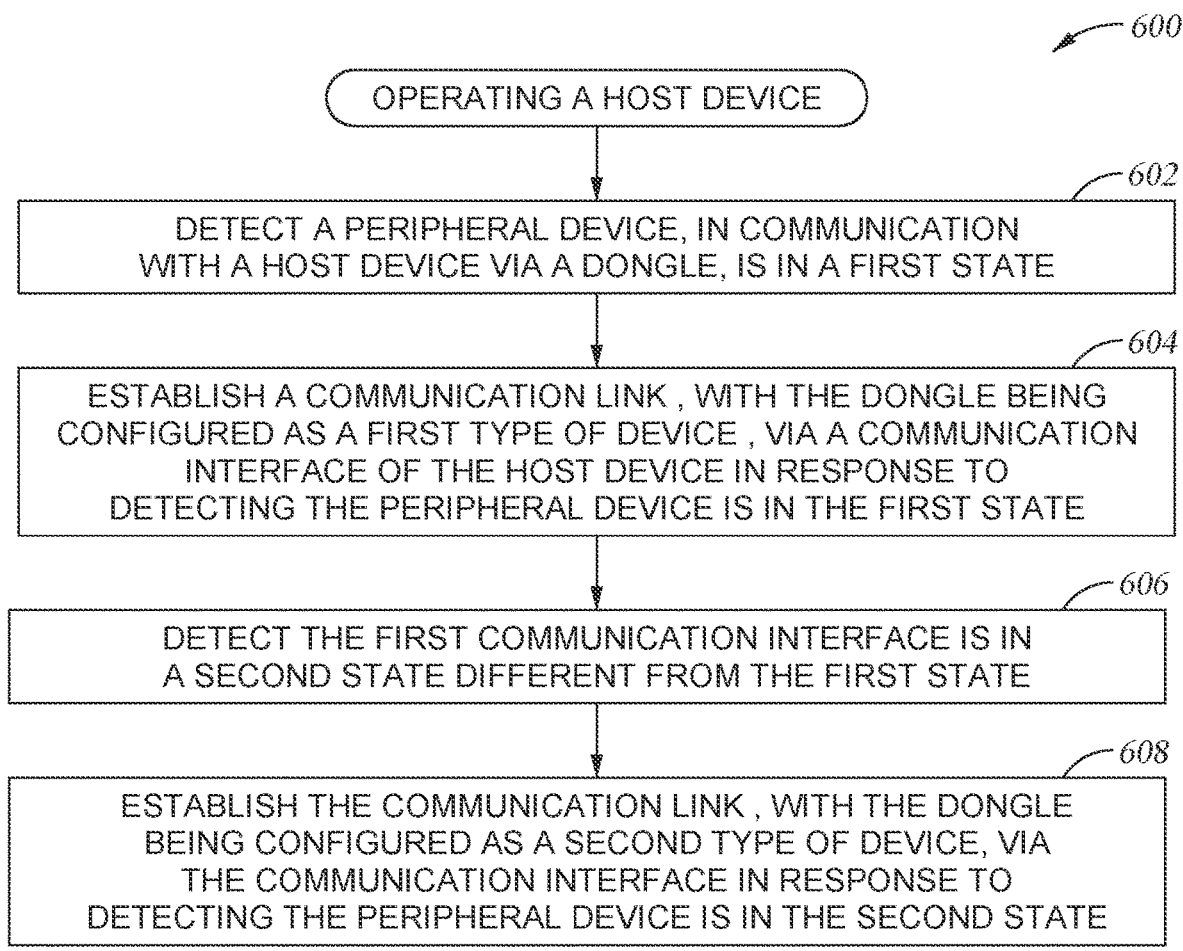
FIG. 6 illustrates an example of a method flow for operating a host device, according to embodiments described herein.

FIG. 6 is a flow diagram illustrating example operations 600 for operating a host device. The operations may be performed by a host device, such as the host device 202 as described herein with respect to FIGS. 1-4.

The operations 600 may optionally begin, at activity 602, where the host device may detect a peripheral device (e.g., the peripheral device 206), in communication with the host device via a dongle (e.g., the dongle 204), is in a first state. The host device may detect the state of the peripheral device via a command associated with the peripheral device, such as a command to disable, enable, power off, or power on the peripheral device. For example, the host device may execute software (e.g., an application) that controls one or more properties associated with the peripheral. For example, the software may provide options to disable, enable, power off, or power the peripheral device. In some cases, the software may support or supplement the transition between device types at the host device, such as providing the driver for the peripheral device or virtual device, clearing the registry associated with the peripheral device or virtual device, etc.

At activity 604, the host device may establish a communication link, with the dongle being configured as a first type of device (e.g., an audio device), via a communication interface of the host device in response to detecting the peripheral device is in the first state. For example, the host device may perform a USB enumeration operation with the dongle configured as the first type of device as described herein. The host device may treat the dongle as the first type of device.

At activity 606, the host device may detect the peripheral device is in a second state different from the first state.

At activity 608, the host device may establish the communication link, with the dongle being configured as a second type of device (e.g., an HID), via the communication interface in response to detecting the peripheral device is in the second state. The host device may treat the dongle as the second type of device, and the host device may refrain from providing the peripheral device as an option for the first type of device.

In certain aspects, the host device may send, to the dongle, an indication to establish the communication link as the first type of device or the second type of device in response to detecting the peripheral device is in the first state or the second state, for example, as described herein with respect to FIG. 4.

Figure 7:
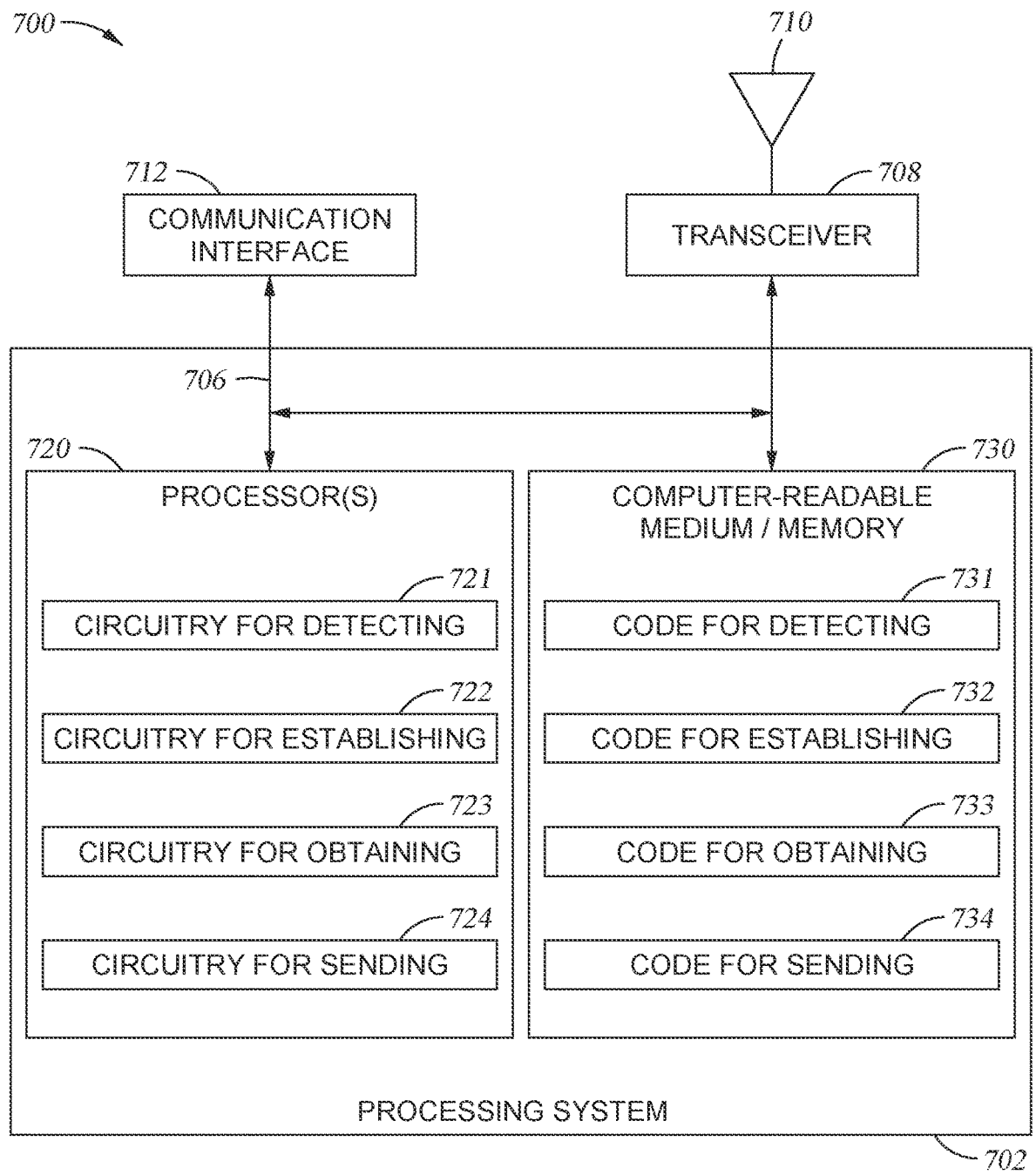
FIG. 7 illustrates an example of an adapter, according to embodiments described herein.

FIG. 7 illustrates aspects of an example adapter 700. In some aspects, the adapter 700 may be a dongle, such as the dongle 110, 204 described herein with respect to FIGS. 1 and 2.

The adapter 700 includes a processing system 702 coupled to a transceiver 708 (e.g., a transmitter and/or a receiver) and a communication interface 712. The transceiver 708 is configured to transmit and receive signals for the adapter 700 via an antenna 710, such as various signals as described herein. The communication interface 712 may be configured to output and obtain signals for the adapter 700. In some aspects, the communication interface 712 may be or include a USB transceiver. The processing system 702 may be configured to perform processing functions for the adapter 700, including processing signals received and/or to be transmitted by the adapter 700.

The processing system 702 includes one or more processors 720. In various aspects, the one or more processors 720 may be representative of the processor 212, as described with respect to FIG. 2. The one or more processors 720 are coupled to a computer-readable medium/memory 730 via a bus 706. In certain aspects, the computer-readable medium/memory 730 is configured to store instructions (e.g., computer-executable code) that when executed by the one or more processors 720, cause the one or more processors 720 to perform the operations 500 described with respect to FIG. 5, or any aspect related to the operations described herein.

The computer-readable medium/memory 730 stores code (e.g., executable instructions) for detecting 731, code for establishing 732, code for obtaining 733, code for sending 734, or any combination thereof. Processing of the code 731-734 may cause the adapter 700 to perform the operations 500 described with respect to FIG. 5, or any aspect related to such operations.

The one or more processors 720 include circuitry configured to implement (e.g., execute) the code stored in the computer-readable medium/memory 730, including circuitry for detecting 721, circuitry for establishing 722, circuitry for obtaining 723, circuitry for sending 724, or any combination thereof. Processing with circuitry 721-724 may cause the adapter 700 to perform the operations 500 described with respect to FIG. 5, or any aspect related to such operations.

Various components of the adapter 700 may provide means for performing the operations 500 described with respect to FIG. 5, or any aspect related to such operations. For example, means for transmitting, sending, or outputting may include the first communication interface 208 of FIG. 2, the second communication interface 210 of FIG. 2, the transceiver 708, the antenna 710, and/or the communication interface 712 of the adapter 700 in FIG. 7. Means for receiving or obtaining may include the first communication interface 208 of FIG. 2, the second communication interface 210 of FIG. 2, the transceiver 708, the antenna 710, and/or the communication interface 712 of the adapter 700 in FIG. 7. Means for establishing a communication link may include the first communication interface 208 of FIG. 2 and/or the communication interface 712 of the adapter 700 in FIG. 7. Means for detecting may include the processor 212 of FIG. 2 and/or the one or more processors 720.

Figure 8:
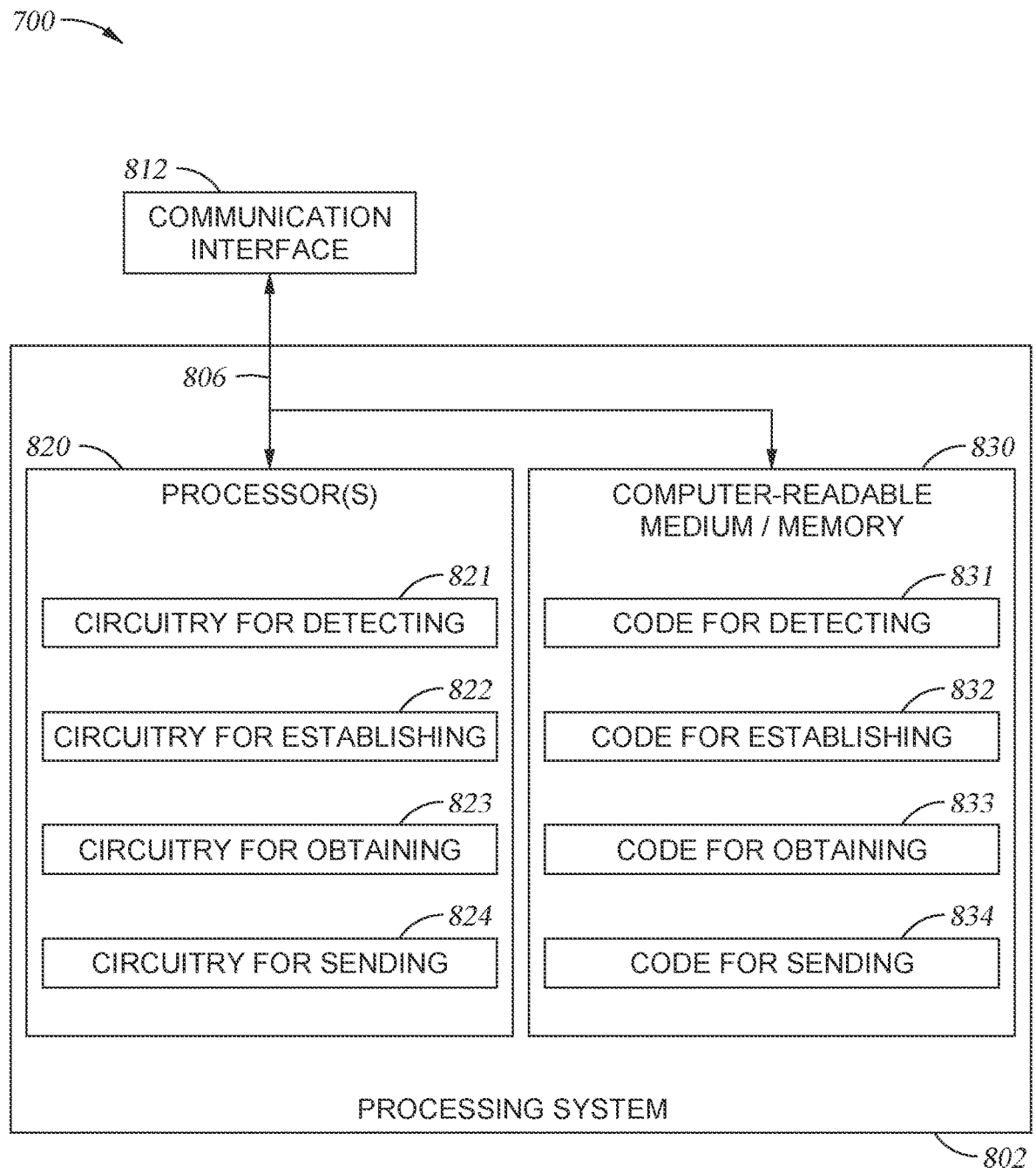
FIG. 8 illustrates an example computing device adapted to perform one or more of the computer implemented methods described herein, according to embodiments described herein.

FIG. 8 illustrates an example computing device 800. In some aspects, computing device 800 is a computer, such as the computer 102 or the host device 202 described herein with respect to FIGS. 1 and 2.

The computing device 800 includes a processing system 802 coupled to a communication interface 808. The communication interface 808 is configured to output and obtain signals for the computing device 800. The processing system 802 may be configured to perform processing functions for the computing device 800, including processing signals obtained and/or to be output by the computing device 800.

The processing system 802 includes one or more processors 820 coupled to a computer-readable medium/memory 830 via a bus 806. In certain aspects, the computer-readable medium/memory 830 is configured to store instructions (e.g., computer-executable code) that when executed by the one or more processors 820, cause the one or more processors 820 to perform the operations 600 described with respect to FIG. 6, or any aspect related to such operations.

The computer-readable medium/memory 830 stores code (e.g., executable instructions) for detecting 831, code for establishing 832, code for obtaining 833, code for sending 834, or any combination thereof. Processing of the code 831-834 may cause the computing device 800 to perform the operations 600 described with respect to FIG. 6, or any aspect related to such operations.

The one or more processors 820 include circuitry configured to implement (e.g., execute) the code stored in the computer-readable medium/memory 830, including circuitry for detecting 821, circuitry for establishing 822, circuitry for obtaining 823, circuitry for sending 824, or any combination thereof. Processing with circuitry 821-824 may cause the computing device 800 to perform the operations 600 described with respect to FIG. 6, or any aspect related to such operations.

Various components of the computing device 800 may provide means for performing the operations 600 described with respect to FIG. 6, or any aspect related to such operations. For example, means for sending may include the communication interface 808 of the computing device 800 in FIG. 8. Means for obtaining may include the communication interface 808 of the computing device 800 in FIG. 8. Means for establishing a communication link may include the communication interface 808 of the computing device 800 in FIG. 8. Means for detecting may include the one or more processors of the computing device 800 in FIG. 8.

While some examples are described herein with respect to the peripheral device being an audio device (e.g., an audio output device and/or an audio input device), aspects of the present disclosure may also be applied to any of various other devices. For example, the peripheral device may be a video display device, and the dongle may be USB-C to High-Definition Multimedia Interface (HDMI) (or any other video interface technology, such as DisplayPort) adapter.

While examples are described herein with respect to there being two states associated with the peripheral device and two device types corresponding to such states, aspects of the present disclosure may also be applied to any number of states and corresponding device types.

While the foregoing is directed to embodiments of the present disclosure, other and further embodiments of the disclosure may be devised without departing from the basic scope thereof, and the scope thereof is determined by the claims that follow.

What is claimed is:

1. A method of operating a dongle, comprising:
   detecting by the dongle that a peripheral device is in a first state;
   establishing, by the dongle, a communication link with a host device in response to detecting the peripheral device is in the first state, wherein the dongle establishes the communication link as a first type of device via a second communication interface, wherein the host device associates a first driver with the first type of device;
   detecting the peripheral device is in a second state different from the first state; and
   establishing, by the dongle in response to detecting the peripheral device is in the second state, that the dongle is associated with a second type of device, wherein the communication link between the host device and the dongle uses a second driver associated with the second type of device, and wherein the first type of device is a different type of device from the second type of device.

2. The method of claim 1, wherein:
   the first state includes when the dongle is in communication with the peripheral device via a first communication interface; and
   the second state includes when the dongle is not in communication with the peripheral device via the first communication interface.

3. The method of claim 1, wherein:
   the first type of device includes an audio device, and
   the second type of device includes a non-audio device.

4. The method of claim 1, wherein:
   the first type of device includes an audio device, and
   the second type of device includes a human interface device.

5. The method of claim 1, wherein establishing the communication link comprises performing a universal serial bus (USB) enumeration operation.

6. The method of claim 1, wherein establishing the communication link comprises providing a device descriptor indicating the first type of device.

7. The method of claim 1, wherein:
   establishing the communication link as the first type of device comprises providing a first product identifier and a first device class associated with the first type of device; and
   establishing the communication link as the second type of device comprises providing a second product identifier and a second device class associated with the second type of device, wherein the first device class is different from the second device class.

8. The method of claim 1, wherein:
   the first communication interface includes a wireless transceiver; and
   the second communication interface includes a universal serial bus (USB) transceiver.

9. The method of claim 1, further comprising obtaining, from the host device, an indication to establish the communication link as the first type of device, wherein detecting the first communication interface is in the first state comprises detecting the first communication interface is in the first state based on the indication.

10. The method of claim 1, further comprising sending, to the host device, an indication to establish the communication link as the first type of device in response to detecting the first communication interface is in the first state.

11. The method of claim 1, wherein establishing the communication link comprises initiating a power cycle at the dongle in response to detecting the first communication interface is in the first state.

12. A dongle, comprising:
    a first communication interface configured to communicate with a peripheral device;
    a second communication interface configured to communicate with a host device;
    a memory; and
    a processor coupled to the memory, the first communication interface, and the second communication interface, wherein the processor is configured to:
    detect the peripheral device is in a first state;
    establish a communication link, with the host device, as a first type of device via the second communication interface in response to detecting the peripheral device is in the first state, wherein the host device associates a first driver with the first type of device;
    detect the peripheral device is in a second state different from the first state; and
    establish the communication link, with the host device, as a second type of device via the second communication interface in response to detecting the peripheral device is in the second state that the dongle is associated with a second type of device, wherein the communication link between the host device and the dongle uses a second driver associated with the second type of device, and wherein the first type of device is a different type of device from the second type of device.

13. The dongle of claim 12, wherein:
    the first state includes when the dongle is in communication with the peripheral device via the first communication interface; and
    the second state includes when the dongle is not in communication with the peripheral device via the first communication interface.

14. The dongle of claim 12, wherein to establish the communication link, the processor is further configured to perform a universal serial bus (USB) enumeration operation.

15. The dongle of claim 12, wherein establishing the communication link comprises providing a device descriptor indicating the first type of device.

16. A non-transitory computer-readable medium storing code that, when executed by one or more processors of a host device, cause the host device to perform a method, the method comprising:
    detecting a peripheral device, in communication with the host device via a dongle, is in a first state;
    establishing a communication link, with the dongle being configured as a first type of device, via a communication interface of the host device in response to detecting the peripheral device is in the first state, wherein the host device associates a first driver with the first type of device;
    detecting the peripheral device is in a second state different from the first state; and
    establishing the communication link, with the dongle being configured as a second type of device, via the communication interface in response to detecting the peripheral device is in the second state, and wherein the first type of device is a different type of device from the second type of device.

17. The computer-readable medium of claim 16, wherein the method further comprises sending, to the dongle, an indication to establish the communication link as the first type of device in response to detecting the peripheral device is in the first state.

18. The method of claim 1, wherein the first type of device is one selected from a group consisting of a keyboard, a mouse, and an audio device, and the second type of device is a different device from any of the first type of devices.

19. The dongle of claim 12, wherein the first type of device is one selected from a group consisting of a keyboard, a mouse, and an audio device, and the second type of device is a different device from any of the first type of devices.

20. The computer-readable medium of claim 16 wherein the first type of device is one selected from a group consisting of a keyboard, a mouse, and an audio device, and the second type of device is a different device from any of the first type of devices.

21. A method of operating a dongle, comprising:
detecting by the dongle that a peripheral device is in a first state;
establishing, by the dongle, a communication link with a host device in response to detecting the peripheral device is in the first state, wherein the dongle establishes the communication link as a first type of device via a second communication interface;
detecting the peripheral device is in a second state different from the first state; and
establishing, by the dongle, the communication link with the host device in response to detecting the peripheral device is in the second state, wherein the dongle establishes the communication link as a second type of device via the second communication interface, and wherein the second type of device is a mouse and the first type of device is not a mouse.

22. A method of operating a dongle, comprising:
detecting that a peripheral device is in a first state;
establishing, by the dongle, a communication link with a host device in response to detecting the peripheral device is in the first state, wherein the dongle establishes the communication link as a first type of device via a second communication interface;
detecting the peripheral device is in a second state different from the first state; and
establishing, by the dongle, the communication link with the host device in response to detecting the peripheral device is in the second state, wherein the dongle establishes the communication link as a second type of device via the second communication interface, and wherein the second type of device is a keyboard and the first type of device is not a keyboard.

23. A method of operating a dongle, comprising:
detecting a by the dongle that a peripheral device is in a first state;
establishing, by the dongle, a communication link with a host device in response to detecting the peripheral device is in the first state, wherein the dongle establishes the communication link as a first type of device via a second communication interface;
detecting the peripheral device is in a second state different from the first state; and
establishing, by the dongle, the communication link with the host device in response to detecting the peripheral device is in the second state, wherein the dongle establishes the communication link as a second type of device via the second communication interface, and wherein the second type of device is an audio device and the first type of device is not an audio device.

* * * * *